(12) United States Patent
Smeyers et al.

(10) Patent No.: US 10,343,726 B2
(45) Date of Patent: Jul. 9, 2019

(54) PRODUCTION OF FORMED AUTOMOTIVE STRUCTURAL PARTS FROM AA7XXX-SERIES ALUMINIUM ALLOYS

(71) Applicant: ALERIS ALUMINUM DUFFEL BVBA, Duffel (BE)

(72) Inventors: Axel Alexander Maria Smeyers, Heist op den Berg (BE); Sunil Khosla, Beverwijk (NL)

(73) Assignee: ALERIS ALUMINUM DUFFEL BVBA, Duffel (BE)

(*) Notice: Subject to any disclaimer, the term of this patent is extended or adjusted under 35 U.S.C. 154(b) by 476 days.

(21) Appl. No.: 14/424,327

(22) PCT Filed: Sep. 9, 2013

(86) PCT No.: PCT/EP2013/068567
§ 371 (c)(1),
(2) Date: Feb. 26, 2015

(87) PCT Pub. No.: WO2014/040939
PCT Pub. Date: Mar. 20, 2014

(65) Prior Publication Data
US 2015/0217813 A1  Aug. 6, 2015

(30) Foreign Application Priority Data
Sep. 12, 2012 (EP) ..................... 12183972

(51) Int. Cl.
*C22F 1/053* (2006.01)
*B62D 29/00* (2006.01)
(Continued)

(52) U.S. Cl.
CPC .......... *B62D 29/008* (2013.01); *B32B 15/016* (2013.01); *C22C 21/10* (2013.01);
(Continued)

(58) Field of Classification Search
CPC .................. C22F 1/053; C22C 21/10
See application file for complete search history.

(56) References Cited

U.S. PATENT DOCUMENTS 3,945,861 A  3/1976 Anderson et al.
4,090,889 A  5/1978 George et al.
(Continued)

FOREIGN PATENT DOCUMENTS

DE  102010045025 A1  5/2011
EP     2518173 A1  10/2012
(Continued)

OTHER PUBLICATIONS

Davis, J.R. "Aluminum and Aluminum Alloys", ASM International, 1993. p. 73-74.*
(Continued)

*Primary Examiner* — George Wyszomierski
*Assistant Examiner* — Janell C Morillo
(74) *Attorney, Agent, or Firm* — Vorys, Sater, Seymour and Pease LLP (57) ABSTRACT

A method of manufacturing a formed aluminum alloy automotive structural part or a body-in-white (BIW) part of a motor vehicle, including the steps of: providing a rolled aluminum alloy bare or composite sheet product having a gauge of about 0.5 mm to 4 mm, wherein the sheet product includes at least one layer an AA7xxx-series aluminum alloy, the sheet product having been subjected to solution heat treatment and quenching followed by at least 1 day of natural ageing; subjecting the naturally aged sheet product to reversion annealing treatment, namely a heat treatment at a temperature between 100° C. and 350° C. during 0.1 to 60 seconds; optionally subjecting the heated sheet product to forced cooling operation; within 2 hours, preferably within 30 minutes, from the reversion annealing treatment, forming (Continued)

the sheet product to obtain a three-dimensionally formed automotive structural part or body-in-white (BIW) part.

19 Claims, 4 Drawing Sheets

(51) Int. Cl.
 *B32B 15/01* (2006.01)
 *C22C 21/10* (2006.01)
(52) U.S. Cl.
 CPC .......... *C22F 1/053* (2013.01); *B32B 2605/00* (2013.01); *Y10T 428/12764* (2015.01)

(56) References Cited

U.S. PATENT DOCUMENTS

| | | | |
|---|---|---|---|
| 6,033,499 A | | 3/2000 | Mitra |
| 2012/0273098 A1* | | 11/2012 | Bohner .................. C22C 21/06 148/695 |

FOREIGN PATENT DOCUMENTS

| | | |
|---|---|---|
| GB | 1392722 A | 4/1975 |
| JP | H0770688 A | 3/1995 |
| WO | 2010049445 A1 | 5/2010 |
| WO | 2010142576 A1 | 12/2010 |
| WO | 2010142579 A1 | 12/2010 |
| WO | 2012059509 A1 | 5/2012 |

OTHER PUBLICATIONS

Wise et al., "High Strength 7xxx Aluminium Alloys for Increased Weight Savings in BiW Applications", European Aluminium Congress, Nov. 23-24, 2009, pp. 1-27.

"The Aluminum Automotive Manual", chapter 2, pp. 1-40 (2002), European Aluminum Association (auto@eaa.be).

Smeyers et al., "7xxx grades for automotive applications", Aluminium International Today, Jan./Feb. 2011, pp. 37-39.

"StructurliteTM 400 for Automotive Structural Parts", Aleris Europe brochure, issued Apr. 2011, Aleris Aluminum Duffel BVBA, Belgium.

"International Alloy Designations and Chemical Composition Limits for Wrought Aluminum and Wrought Aluminum Alloys", The Aluminum Association, Inc., pp. 1-28, Feb. 2009.

Minoda Tadashi et al: "The effect of reversion heat treatment on bendability of 7475 aluminum alloy sheet", Journal of Japan Institute of Light Metals, [Online] vol. 49, No. 4, Jul. 1, 1999 (Jul. 1, 1999), p. 1, XP002687157, ISSN: 0451-5994 Retrieved from the Internet: URL:http://sciencelinks.jp/j-east/article/199913/000019991399A0391671.php> [retrieved on Nov. 14, 2012].

International Search Report and the Written Opinion dated Oct. 4, 2013 for International Patent Application No. PCT/EP2013/068567 to Aleris Aluminum Duffel BVBA having an International filing date of Sep. 9, 2013.

International Preliminary Report on Patentability dated Mar. 17, 2015 for PCT International Application No. PCT/EP2013/068567, International Filing date Sep. 9, 2013.

* cited by examiner

PRODUCTION OF FORMED AUTOMOTIVE STRUCTURAL PARTS FROM AA7XXX-SERIES ALUMINIUM ALLOYS

CROSS-REFERENCE TO RELATED APPLICATIONS

This is a § 371 National Stage Application of International Application No. PCT/EP2013/068567 filed on 9 Sep. 2013, claiming the priority of European Patent Application No. 12183972.4 filed on 12 Sep. 2012.

FIELD OF THE INVENTION

This invention relates to a method of manufacturing a formed automotive structural part or body-in-white part out of an AA7xxx-series aluminium alloy bare sheet or composite sheet material, as well as an automotive structural part or body-in-white part.

BACKGROUND TO THE INVENTION

As will be appreciated herein below, except as otherwise indicated, aluminium alloy designations and temper designations refer to the Aluminum Association designations in Aluminum Standards and Data and the Registration Records, as published by the Aluminum Association in 2010.

For any description of alloy compositions or preferred alloy compositions, all references to percentages are by weight percent unless otherwise indicated.

In the production of motor vehicles in particular aluminium alloys of the AA5xxx- and AA6xxx-series alloys like 5051, 5182, 5454, 5754, 6009, 6016, 6022, and 6111, are common and proven alloys to produce automotive structural parts and body-in-white ("BIW") parts.

Body-in-white consists of the structural components of the automobile, not including closures and moving parts (e.g. door panels, hood panels, trunk lid panels). Other automotive structural parts are for example B-pillar, tunnel section or engine bulkhead, all of which may be manufactured by the inventive method. During the last 7 to 12 years, (very) high strength steel grades were developed and different production, forming and joining techniques were created and setup which allowed car manufactures to use these grades to produce automotive structural parts and body-in-white ("BIW") parts. Using these grades allows the car manufactures to achieve high passenger safety in case of crash while adding (much) less weight as would be the case when traditional steel grades and AA5xxx and AA6xxx-series aluminium alloys would be used for this purpose.

To be able to achieve even higher weight savings, there is a demand for the use of high strength aluminium alloys, in particular for formed structural and BIW parts, which are formable and having in particular increased strength after being subjected to a paint bake cycle. In addition, the material properties normally required to produce such parts include a high formability for the forming operation (typically by means of stamping, deep drawing, or roll forming), high mechanical strength after paint baking so as to enable down gauging and thus minimising the weight of the part, good behaviour in the various assembly methods used in motor vehicle manufacturing such as spot welding, laser welding, laser brazing, clinching or riveting, and an acceptable cost for mass production.

AA7xxx-series aluminium alloys are able to deliver the required strength after being subjected to a paint bake cycle. However, formability of these alloys is poor to very poor, in particular because AA7xxx-series alloys naturally age after solution heat treatment followed by quenching (together referred to herein as "SHT"), leading to a significant strength increase by about 80% within one week after solution heat treatment and quenching. Formability would be acceptable if AA7xxx-series sheet products could be formed within a few hours of SHT, but this is not practical because the solution heat treated and quenched sheet product needs to be transported from the rolling mill to the automobile manufacturer before it is formed into its final shape by the latter.

To overcome this problem, it has previously been suggested in DE 10 2010 045 025 A1 and WO 2010/142576 to effectively repeat solution heat treatment and quenching immediately prior to forming, i.e. on the site of the automobile manufacturer. This method is referred to as "W-temper process", because the sheet material is effectively returned to the W-temper (as explained below). According to WO 2010/142576, the W-temper process involves soaking the sheet product for a period of 3 sec to 15 min. at a temperature between 400° C. and 490° C., followed by rapid cooling or quenching, namely water quenching (or quenching via contact between cold plates).

A disadvantage of the W-temper process is the high energy consumption required for the high temperature treatment, as well as the necessity of water quenching. In addition, the higher the temperature, the higher the risk that the aluminium alloy sheets stick to the tooling if direct contact heating is used. Further, one has to be careful not to start artificial aging (e.g. by paint baking) too early after the W-temper process, as this may lead to reduced mechanical properties, thus requiring unwelcome delays in the automobile production process.

DESCRIPTION OF THE INVENTION

It is an object of the invention to provide a method of manufacturing an automotive structural part or body-in-white part out of an AA7xxx-series aluminium alloy bare sheet or composite sheet material, which does not have the above disadvantages, i.e. which allows to provide AA7xxx-series aluminium alloy sheet having undergone natural ageing, and yet with sufficient formability, by means of a cost-efficient and easy-to-implement process.

These and other objects and further advantages are met or exceeded by the present invention providing a method of manufacturing a formed aluminium alloy automotive structural part or a body-in-white (BIW) part of a motor vehicle, the method comprising at least the steps of:
  a. providing a rolled aluminium alloy sheet product having a gauge in a range of about 0.5 mm to 4 mm, wherein the sheet product comprises at least one layer made from an aluminium alloy of the AA7xxx-series, the sheet product having been subjected to solution heat treatment and quenching followed by a period of natural ageing of at least 1 day;
  b. subjecting the naturally aged sheet product to a reversion annealing treatment, namely a heat treatment at a temperature between 100 and 350° C. during 0.1 to 60 seconds;
  c. optionally subjecting the heated sheet product to a forced cooling operation;
  d. within 2 hours, preferably within 30 minutes, from the reversion annealing treatment, forming the aluminium alloy sheet to obtain a three-dimensionally shaped formed automotive structural part or body-in-white (BIW) part.

The provided AA7xxx sheet products are preferably produced by casting, homogenising, scalping, preheating, hot working, cold working, solution heat treating and quenching, followed by a period of natural ageing. The natural ageing period is usually at least 2 days, typically more than 1 or 2 weeks, often about 1 to 4 months.

Heat treatable alloys, such as 7xxx-series alloys, after having been solution heat treated and quenched may be classified as W temper or upon thermally treating (thermally treating meaning to produce a stable temper by means of artificial aging or by an extended period of natural ageing) as Tx temper.

In particular, the provided rolled aluminium alloy sheet product may be in any one of the following tempers: W temper, T1, T2, T3, T4, T5 or T10 temper, wherein W-(1 to 90 days) and T4 temper are preferred.

W temper is classified as solution heat treated and quenched. It is an unstable temper applicable only to alloys that spontaneously age at room temperature after solution heat treatment, such as AA7xxx-series alloys. This designation is specific only when the period of natural ageing is indicated; e.g. W ½ hr.

T temper is classified as a thermally stable temper:

T1 refers to cooling from an elevated temperature shaping process and naturally aged to a substantially stable condition. Applies to products that are not cold worked after cooling from an elevated temperature shaping process, or in which the effect of cold work in flattening or straightening may not be recognised in mechanical property limits.

T2 refers to cooling from an elevated temperature shaping process, cold worked, and naturally aged to a substantially stable condition. Applies to products that are cold worked to improve strength after cooling from an elevated temperature shaping process, or in which the effect of cold work in flattening or straightening is recognised in mechanical property limits.

T3 refers to solution heat treated, cold worked, and naturally aged to a substantially stable condition. Applies to products that are cold worked to improve strength after solution heat treatment, or in which the effect of cold work in flattening or straightening is recognised in mechanical property limits.

T4 refers to solution heat treated and naturally aged to a substantially stable condition. Applies to products that are not cold worked after solution heat treatment, or in which the effect of cold work in flattening or straightening may not be recognised in mechanical property limits.

T5 refers to cooling from an elevated temperature shaping process, and then artificially aged. Applies to products that are not cold worked after cooling from an elevated temperature shaping process, or in which the effect of cold work in flattening or straightening may not be recognised in mechanical property limits.

T10 refers to cooling from an elevated temperature shaping process, cold worked, and then artificially aged. Applies to products that are cold worked to improve strength, or in which the effect of cold work in flattening or straightening is recognised in mechanical property limits.

When solution heat treating and quenching products of the 7xxx-series alloy system, a microstructure consisting of super saturated solid solution and quenched in vacancies is present, these microstructural features combine to form strengthening particles that show an approximate "square root function" strength increase over time (with respect to natural ageing), this is a result of particles growing to an optimum size/number density. Therefore, the necessary waiting times of several days between quenching and forming result in a substantial loss in formability.

A great advantage of applying the inventive reversion annealing treatment to a bare or composite blank of an AA7xxx-series alloy within a limited time before the forming operation is the fact that one does not have to take into account the effect of shelf life on the formability. The reversion annealing treatment of the invention, given to the AA7xxx-series aluminium alloy after having been solution heat treated, quenched (hard or soft) and naturally aged for more than 1 day or even 2-4 weeks, (or even 1-6 months) removes a substantial amount of the strengthening particles (strengthening particles can be aggregates, solute rich clusters, vacancy rich clusters, GP(I) zones GP(II) zones) that will have developed as a result of the natural aging following the SHT, that will have placed the alloy in a supersaturated solid solution. The application of a short heat treatment according to the invention leads to the dissolution of the majority of these strengthening particles, which in turn results in a substantial softening of the material, improving the formability of these AA7xxx-series aluminium alloys and retaining adequate solute in solution such that a strengthening response is still achievable during downstream heat treatments such as a paint bake cycle.

This is due to the fact that any strengthening particles that may have materialised due to natural ageing (following the SHT) and that have failed to grow to a certain size/stability will be taken back into solution upon application of the reversion annealing treatment. However, the particles that were stable enough not to be reverted back in to solution will remain in the microstructure to facilitate the nucleation/growth of the metastable η' strengthening precipitates during the later paint bake cycle.

The inventors have found that, if 7xxx-series alloys are to be artificially aged, the prior natural ageing time and heat-up rate to the artificial ageing temperature can influence the final mechanical properties. If only a short time period has elapsed between SHT followed by quenching and artificial ageing there will have been insufficient time for a large number of relatively stable strengthening particles to form (these particles act as nucleation sites and/or facilitate the growth of the metastable η' strengthening precipitates) and consequently reduced mechanical properties will be realised. If a too fast heat-up rate is utilised, the strengthening particles may dissolve before they can facilitate the nucleation and/or growth of the metastable η' strengthening precipitates, consequently, reduced mechanical properties will be realised. Therefore, a certain period of natural ageing is required after a W temper process as described in the prior art.

Therefore, a great benefit of using a reversion anneal heat treatment over a W-temper process is the fact that the particles that were stable enough not to be reverted back in to solution will remain in the microstructure to facilitate the nucleation/growth of the metastable η' strengthening precipitates during the paint bake cycle. As a consequence, no or very little natural aging time (less than 2 days, preferably less than 2 hours) is required between the reversion anneal heat treatment and subsequent forming and the paint bake cycle to be able to achieve the final high yield strength.

Using a W-temper process, by contrast, dissolves all strengthening particles irrespective of natural ageing time/size/stability. As a consequence, some natural aging needs to take place during 2 to even up to 10 days after this W-temper process to be able to achieve the final high yield strength by means of the subsequent paint bake cycle. The higher the heat up speed used in the paint bake cycle, the longer the natural aging times needs to be after the W-temper process. Due to logistical reasons, it is not always allowed or possible to store the formed parts during 2 or more days before they have to be assembled and/or shortly afterwards have to be subjected to a paint bake cycle.

Therefore, according to a preferred embodiment of the invention, the formed part is subjected to a paint bake cycle within 5 days, preferably 2 days, most preferred within 1 day of the forming operation, and wherein said paint bake cycle results in a yield strength of at least about 300 MPa, preferably at least about 350 MPa, and most preferred of at least about 400 MPa in said AA7xxx-series alloy product.

Typically following the forming operation, the formed part is made part of an assembly of other metal components as is regular in the art for manufacturing vehicle components, and subjected to a paint bake operation to cure any paint or lacquer layer applied. Such a treatment is in the art designated by the terms "paint-bake" or "paint-baking", and going through such a treatment is designated in the art by the term "paint-bake cycle". During the paint bake cycle the formed AA7xxx-series alloy (core) achieves also its desired final strength levels. The paint bake cycle typically comprises one or more sequential short heat treatment in the range of about 140° C. to 200° C. for a period of about 10 to less than 40 minutes, and typically of less than 30 minutes. A typical paint bake cycle would comprise a first heat treatment of about 180° C.@20 minutes, cooling to ambient temperature, then about 160° C.@20 minutes and cooling to ambient temperature. In dependence of the automobile manufacturer such a paint bake cycle may comprise of 2 to even up to 5 sequential steps and includes drying steps, but either way the cumulated time at elevated temperature (100° C. to 200° C.) of the aluminium alloy product is less preferably than 120 minutes.

The inventors' experiments have shown that the temperature reached by the sheet product during the reversion annealing treatment is advantageously between 150° C. and 250° C., preferably between 170° C. and 220° C., most preferred between 175° C. and 190° C. 180° C. has proven to be particularly advantageous, as it combines a substantial improvement in formability with very high tensile properties after paint baking. In addition, it has the advantage that it is fairly low, so that the sheet can be quickly brought to this temperature, and quickly be cooled down again.

The length of the reversion annealing treatment may be very short, in fact it appears sufficient that the metal sheet merely reaches the target temperature for a very short time, such as 0.1 or 1 seconds. It is preferred that the treatment does not last longer than 5 minutes, preferably 2 minutes, most preferred less than 1 minute. For practical reasons, usually the reversion annealing treatment will be done for about 1 to 30 seconds, preferably 2 to 15 seconds, most preferred 2 to 8 seconds. A length of around 6 seconds is suitable.

Experiments have shown that also the heat-up rate of the sheet product is relevant. It appears that a fast heating rate of between 10-80° C./sec, preferably 20-60° C./sec is advantageous.

After having reached the reversion annealing temperature and being held there for the prescribed time, the sheet product is preferably cooled down again reasonably quickly, at a rate of around 5-100° C./sec, preferably 50° C./sec. The advantage of the present reversion annealing treatment at low temperatures is that such cooling rates may be achieved by natural cooling, at least for thin sheet products having a gauge of less than 1.5 mm, or less than 1 mm. Thus, the optional forced cooling step may not be required for such sheet. In other embodiments, which are particularly suitable for thicker gauges, the sheet products are actively cooled down from the reversion annealing temperature, for example by an air jet, water spray or water quench. Whether active cooling is preferred will also depend on the alloy composition.

For the reversion annealing treatment, contact heating is preferred, wherein the sheet product is held between two hot plates. This method is sometimes referred to as "Waffeleisen". It may—if considered advantageous for this alloy composition and sheet thickness—be followed by active cooling, in which the heated sheet product is held between two cold plates. However, any other heating methods are also possible, in particular continuous heat treatment techniques, although batch processes are also possible. For example, the reversion annealing heat treatment may be done in a continuous hot air jet furnace, by means of circular induction ultrasonic heating, or by infrared (IR) radiation.

In some embodiments of the invention, the complete sheet product is subjected to the reversion annealing treatment. In other embodiments, only one or more parts of the sheet product are being subjected to the reversion annealing, for example by holding only parts of the sheet product in between two hot plates. This partial reversion annealing may be particularly useful if parts of the sheet product will undergo stronger or more complex deformation during the forming process than others. If the forming operation consists of several steps, it is also possible to first subject the complete sheet product to the reversion annealing, perform the first (gentle) forming step, and then, after some time may have elapsed, submit one particular part of the half-formed sheet product to another reversion annealing. This will soften a part of the sheet product again, which may be necessary for the next forming step, resulting in a more complex shape. For heating only a part of the sheet product, e.g. induction heating may be used for local heating.

In some embodiments, the steps of claim 1 will be done consecutively. In other embodiments, the sheet product is subjected to the reversion annealing treatment in between two forming steps.

Preferably, the sheet product is cut into blanks after the reversion annealing treatment, flattened and then submitted to the forming operation, which may consist of several forming steps.

In the case of a composite product, the core layer is made from an aluminium alloy of the AA7xxx-series, and the one or several clad layers are preferably made from an AA3xxx-series, AA4xxx-series, AA5xxx-series, AA6xxx-series alloy or a different AA7000-series aluminium alloy compared to the core alloy, preferably a lean AA7xxx-series alloy such as an AA7072 alloy. The clad layer material can have a chemical composition within the ranges of AA3004, AA3005, AA6016, AA6016A, AA6005, AA6005A, AA5005, AA5005A, AA5754, AA5051A, AA5052, AA5252, AA5352, and AA5018.

The forming operation is preferably a cold forming operation, i.e. it is performed at ambient (room) temperature, e. g. at about 15° C. to 35° C. Alternatively, forming is done at 15° C. to 250° C. It can be any forming operation used to shape three-dimensional motor vehicle components, and includes in particular operations like stamping, deep drawing, pressing, press forming, and roll forming, or combinations thereof, either at ambient or at elevated temperatures. The forming into the three-dimensionally formed part can be done in one or more different steps. The reversion annealing is preferably done on the sheet before performing the first forming step but could also or in addition be done between two different forming steps.

Before forming, the aluminium bare or composite sheet material may be coated with a lubricant, oil or dry lubricant, suitable for the forming operation, the assembly and the surface treatment of the structural part to be produced.

The automotive structural parts that can be formed from the reversion annealed sheet product include automotive door inner panels, door outer panels, side panels, inner hoods, outer hoods, and/or trunk lid panels, as well as A-pillars, B-pillars and C-pillars, and other BIW parts.

As used herein, "formability" and the like means the relative ease which a bar or composite sheet material can be shaped through plastic deformation into a three-dimensional object. For example, the formability of an automotive panel fabricated of a bare or composite sheet material may be determined, at least in part, by the Limiting Drawing Ratio. The formability of an automotive panel fabricated of a AA5xxx or 6xxx-alloy series bare aluminium sheet material or an aluminium composite sheet material with a core out of an aluminium AA5xxx or 6xxx-alloy series may in some instances be determined by the elongation (higher elongation percentages may indicate better formability). However, this is not the case for aluminium sheets of the AA7xxx-alloy series. For instance, no or only a very small difference is noticed between the formability (more specific deep drawing) of a AA7xxx-alloy series aluminium sheet in the T4 temper, with an elongation around 18 to 21%, and a AA7xxx-alloy series aluminium sheet in the T79 temper, with an elongation around "only" 10%. Also the difference between the elongation of a AA7xxx-alloy series aluminium sheet in the T4 temper and the elongation of a AA7xxx-alloy series aluminium sheet in the W-temper or the elongation of a T4 temper sheet only a limited time after being subjected to a reversion annealing treatment is limited (max 2 to 4%) while the difference in formability is substantial to very high.

Therefore, formability has been measured in the invention by the so-called "cross-die test", in which the sample sheet was formed by a deep-drawing or stamping operation using a cross-shaped die, and measuring the maximum cross-die height achievable before failure of the sheet material.

Although the dimensions of the aluminium bare or composite sheet products can be varied in many ways for use in automotive structural parts, such as body panels, in accordance with this invention, its total thickness (viz. the core and all clad layers taken together in case of a composite material) is in a range of about 0.5 to about 4 mm, preferably about 0.7 or 1.0 mm to about 3.5 mm, and more preferably of about 1.5 to about 3.0 mm. In case a composite material is used, the clad layer or clad layers are usually much thinner than the core sheet, and each clad layer constituting about 2% to about 25% of the total composite sheet thickness. A clad layer more typically constitutes around about 2% to about 15% of the total composite sheet thickness. In case of a bare sheet product, it is wholly composed of a 7xxx-series aluminium alloy, in the case of a composite sheet product, at least the core layer is made of a 7xxx series alloy.

In an embodiment the aluminium alloy of the 7xxx-series is selected from the group of AA7021, AA7136, AA7050, AA7055, AA7150, AA7075, AA7081, AA7181, AA7085, AA7185, and modifications thereof.

In a preferred embodiment of the invention, the bare sheet or core of the composite sheet is made from an aluminium alloy having a composition consisting of, in wt. %, Zn 3.8 to 8.2, preferably 5.0 to 7.0, most preferred 5.5 to 6.5,
Mg 1.5 to 2.3, preferably 1.5 to 2.1,
Cu <0.45, preferably <0.30,
Zr 0.04 to 0.25%,
optionally one or two elements selected from the group consisting of:
Mn 0.05 to 0.5%,
Cr 0.05 to 0.5%,
Ti 0 to 0.15,
Fe 0 to 0.35,
Si 0 to 0.25,
other elements (or unavoidable impurities) each <0.05, total <0.2, and balance aluminium.

In a further embodiment of the invention, the bare sheet or core of the composite sheet is made from an aluminium alloy having a composition consisting of, in wt. %, Zn 3.8 to 8.2, preferably 5.0 to 7.0, most preferred 5.5 to 6.5,
Mg 1.5 to 2.3, preferably 1.5 to 2.1,
Cu 0.6 to 2.4, preferably 1.2 to 2.4,
Zr 0.04 to 0.25%,
optionally one or two elements selected from the group consisting of:
Mn 0.05 to 0.5%,
Cr 0.05 to 0.5%,
Ti 0 to 0.15,
Fe 0 to 0.35,
Si 0 to 0.25,
other elements (or unavoidable impurities) each <0.05, total <0.2, and balance aluminium.

The invention is also directed to a formed aluminium alloy automotive structural part or a body-in-white part of a motor vehicle, manufactured by the above-described method.

Further, the invention is directed to a motor vehicle comprising such structural part or body-in-white part.

In an embodiment, an additional pre-ageing heat treatment, as described in WO 2012/059509, is carried out between the forming operation and the paint bake cycle. Such pre-ageing heat treatment is typically carried out at a temperature between 50° C. and 250° C., preferably 70° C.-210° C., most preferred 100° C.-140° C. The formed product should be kept at the pre-ageing temperature for not longer than 5 hours to avoid a reduction in productivity, and more preferably not longer than about 1 hour. The minimum time is about 1 minute. Typically, the pre-ageing treatment is carried out for several minutes, e. g. 2-30 minutes, preferably 4 or 8 minutes. The effect of such pre-ageing treatment is to reduce the delayed fracture sensitivity of the formed aluminium part. It has been found that AA7xxx-series sheet alloys when formed for example by means of stamping into three dimensionally formed parts can be sensitive to fracture cracking when at ambient temperature in an ambient atmosphere like a press shop, thus in a commonly non-aggressive corrosive environment. This results in the stamped parts showing a significant tendency to the formation of cracks not immediately during or upon the forming operation, but with some delay of a view or even several days. However, when subjecting the formed part to a pre-ageing treatment, the sensitivity to delayed fracture is significantly reduced or even overcome. The pre-ageing treatment may consist of one single heat-treatment, but may also be carried out as a series of two or more heat-treatments at different temperatures.

SHORT DESCRIPTION OF THE FIGURES

The invention shall now be further described by means of examples with reference to the accompanying drawing, in which.

EXAMPLE 1

A rolled aluminium alloy bare sheet product has been produced by casting an enriched AA7021 type alloy having the following composition (in wt. %): 6.4 Zn, 1.9 Mg, 0.14 Zr, 0.15 Fe and 0.1 Si, remainder aluminium and incidental impurities. The cast ingot was homogenised, scalped, preheated and hot-rolled down to about 4.2 mm and finally cold-rolled to the final gauge of 1.2 mm.

The cold-rolled sheet was subjected to a solution heat treatment at 465° C. and quenched by water quenching. After quenching, the sheet was cut into numerous tensile test blanks, each of which were brought to a different temper. In particular, tensile tests were done at 20 and 60 minutes after quenching (W-20 min and W-60 min), as well as as-received T4 (approximately 6 months natural ageing (NA)). Some of the T4 specimens were then subjected to a reversion annealing treatment by clamping between two hot plates of a certain temperature for a pre-determined time between 2 and 10 seconds. After removal from the hot plates, the specimens were quenched in cold water, and subjected to tensile tests within about 2 hours.

Figure 1:
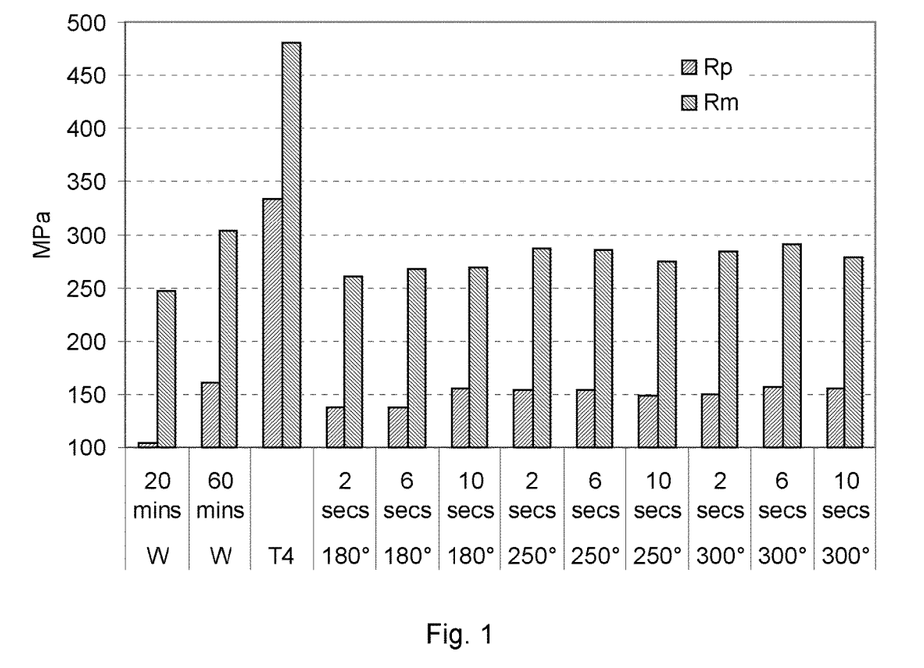
FIG. 1: is a diagram of the yield strength (Rp) and the ultimate tensile strength (Rm) of a bare sheet product made of an enriched AA7021 type alloy in different tempers, namely W-20 min, W-60 min, T4, and after reversion annealing in accordance with the invention, for various times (in seconds) and temperatures (in ° C.).

The results of tensile tests performed are shown in FIG. 1. As can be seen in FIG. 1, a short heat treatment of 100° C. up to max 350° C. during a time between 1 and 12 seconds reduces the yield strength of the 7xxx alloy, independent of the amount of natural aging it had, again to a same low level it had in the time between 0 and 60 minutes after SHT and quenched. In addition, its ductility and formability has become much better than in the typical natural aged condition (temper T4). FIG. 1 also demonstrates that as low temperature as 180° C. gives similar or even better results than a higher temperature of 300° C., which is surprising in view of the prior art teaching of WO 2010/142579 A1, requiring a temperature as high as 400° C.

Figure 2:
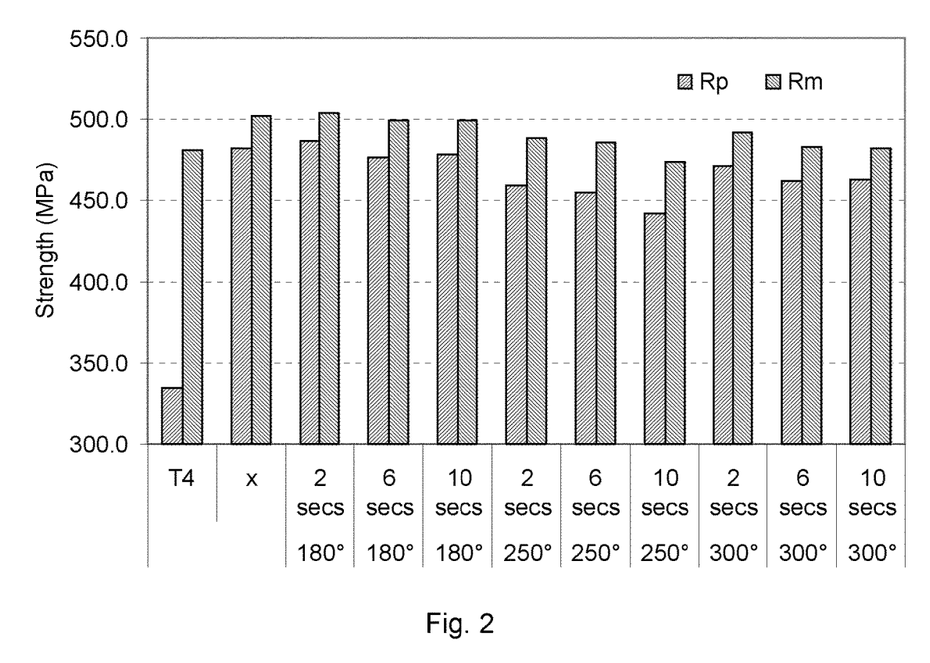
FIG. 2: A graph of yield strength (Rp) and ultimate tensile strength (Rm) for the same sheet as in FIG. 1, and having been subjected to the same reversion annealing treatments, but thereafter having been subjected to an artificial ageing cycle following 10 days of natural ageing after the reversion treatments, thus resulting in T79 type temper.

It is of course necessary that this heat treatment has no or only little effect on the strength of the final part, i.e. after subjecting the formed part to a paint bake cycle. Therefore, the specimen of FIG. 1 were subjected to an aging treatment of 90 C/3 h+130 C/5 h+150 C/10 h, producing a T79 type temper. Afterwards, the strength values were measured again, and FIG. 2 shows the results. Accordingly, a comparable strength was achieved with the reversion annealed materials, as compared to T4 plus artificial age (denoted by variant x). 180° C. appears to be a good temperature for reversion annealing, resulting in particularly high yield strength values after artificial ageing.

Figure 3:
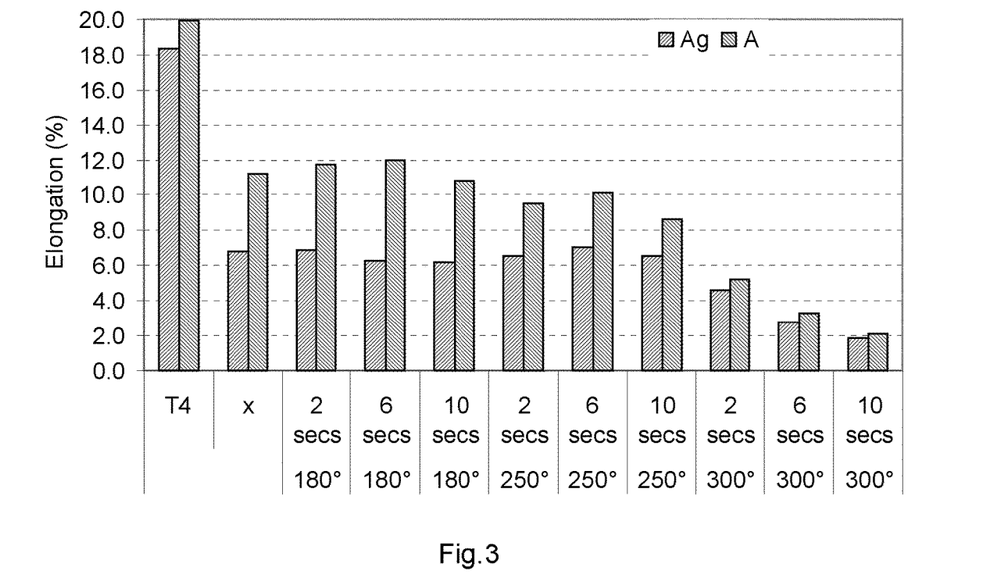
FIG. 3: A graph of uniform elongation (Ag) and total elongation (A) of the same sheets and in the same temper (T79) as in FIG. 2.

For the same samples, the elongation was also measured, as shown in FIG. 3. Thus, a reversion treatment at 180° C. gives similar results to a T4 plus artificial age (x). Higher temperatures and longer times in the reversion annealing results in a ductility decrease. Therefore, lower temperatures and times are preferred in the present invention.

EXAMPLE 2

Another sheet product was prepared by casting aluminium alloys AA7081 and AA7072 separately, homogenising, and roll-bonding the AA7072 alloy as cladding to the AA7081 alloy as core layer. This product was hot-rolled to a gauge of about 4.2 mm, and cold-rolled to a final gauge of 1.2 mm. This rolled sheet product was solution heat treated and quenched, and then cut into tensile test blanks, which were brought to the same tempers and subjected to the same reversion annealing treatments as in example 1.

Figure 4:
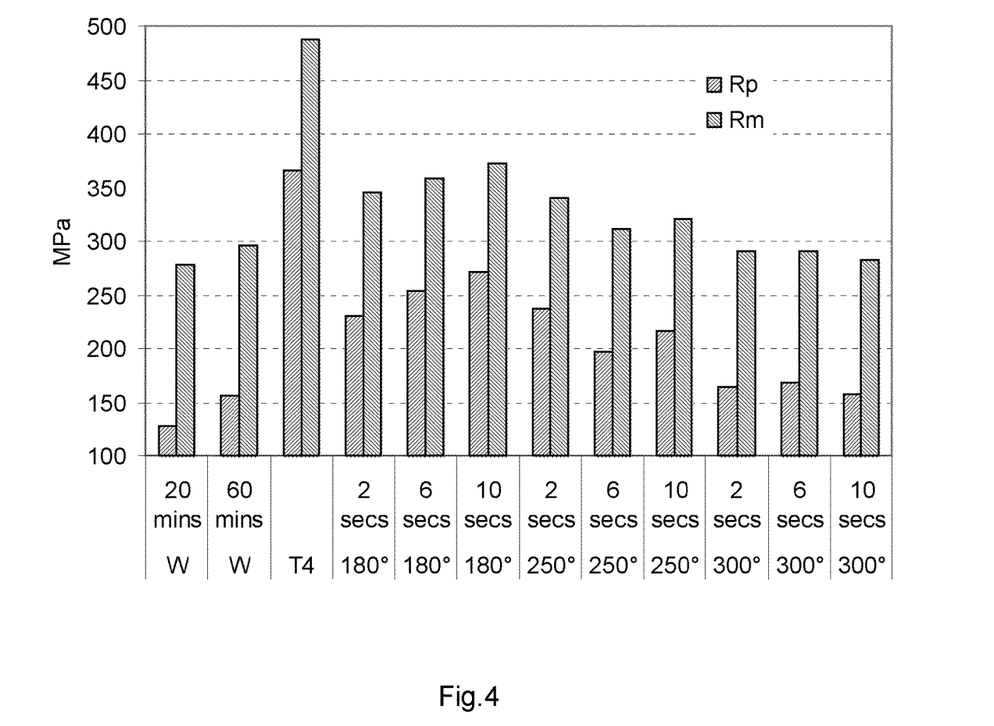
FIG. 4: A graph of yield strength (Rp) and ultimate tensile strength (Rm) of a composite aluminium alloy sheet made of AA7081 alloy clad with AA7072, in W-20 min, W-60 min and T4 temper, as well as after reversion annealing, wherein the numbers indicate time (in seconds) and temperature (in ° C.) of the treatment.

The results of the tensile tests, executed within 2 hours after the reversion annealing, are shown in FIG. 4—again, the numbers indicate the time and temperature of the reversion annealing treatment. Again, the results show that the inventive annealing results in a significant reduction in yield strength and tensile strength compared to T4 temper, thereby allowing much more complex forming operations to be performed on this composite sheet.

Figure 5:
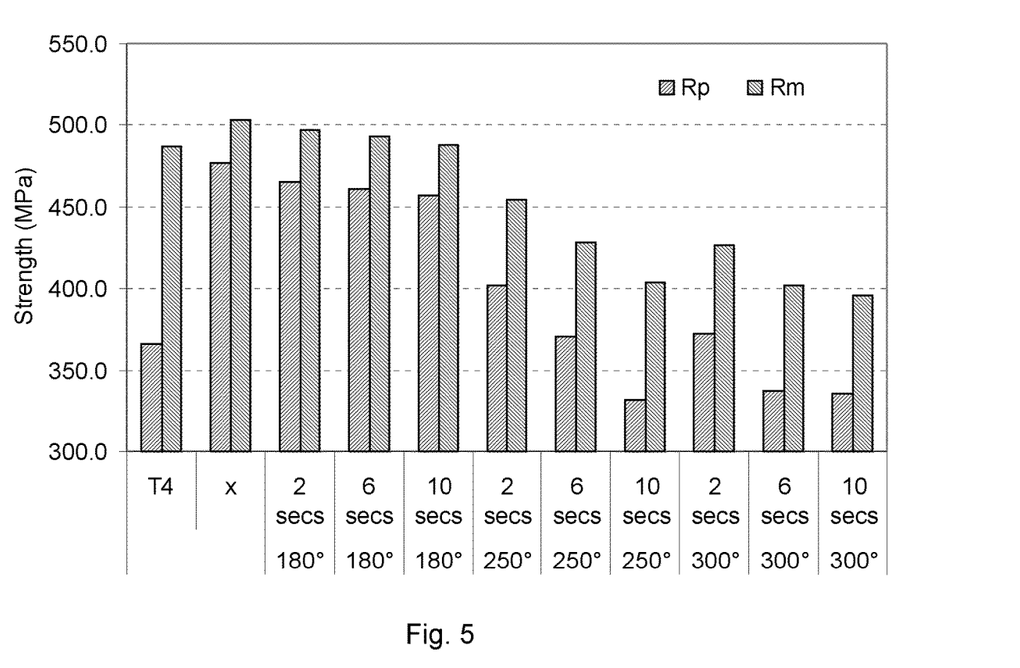
FIG. 5: The strength values of the same sheets as FIG. 4, but after having been subjected to an artificial ageing treatment following 10 days of natural ageing after the reversion treatments, thus resulting in T79 type temper.

As in example 1, the samples were subjected to an artificial ageing treatment of 90 C/3 h+120 C/5 h+150 C/10 h following 10 days of natural ageing after the reversion treatments. As shown in FIG. 5, even higher strengths are realised at a reversion annealing temperature of 180° C., as compared to 250° C. or 300° C. Higher temperatures appear to result in a lower final strength.

Figure 6:
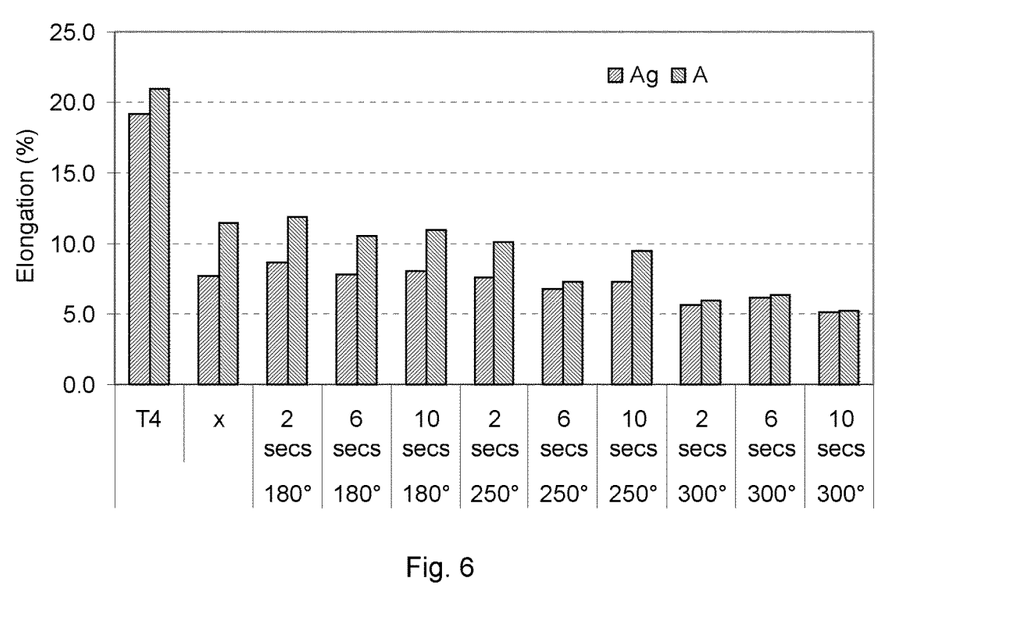
FIG. 6: A graph of uniform elongation (Ag) and total elongation (A) of the same sheet products as in FIG. 5, also after artificial ageing (T79 temper).

FIG. 6 shows finally the elongation of the samples shown in FIG. 5. A trend is visible that higher annealing temperatures result in a lower ductility.

EXAMPLE 3

Figure 7:
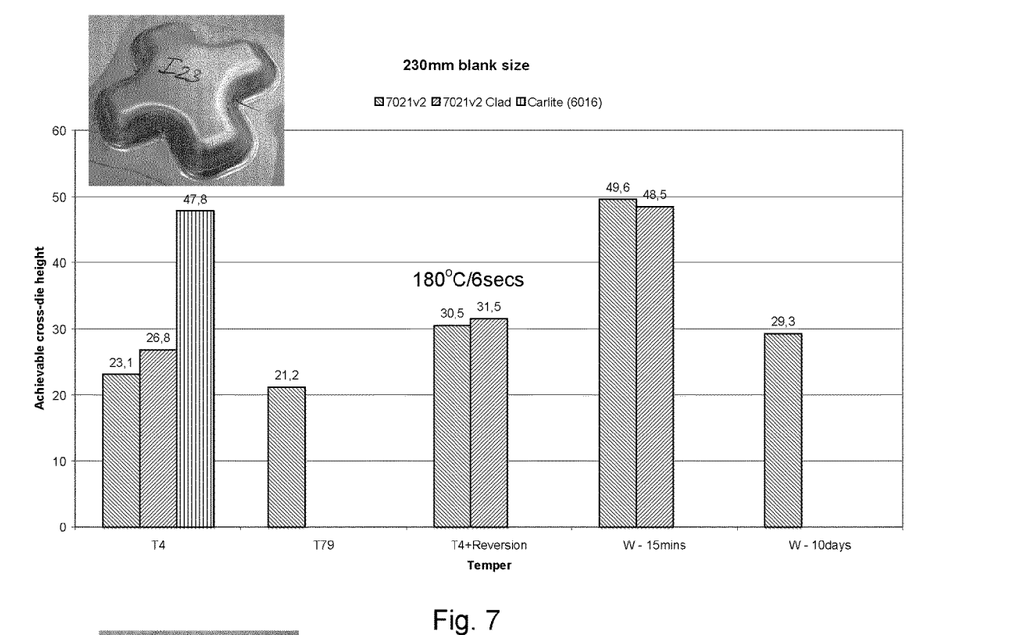
FIG. 7: Achievable cross-die height for various sheet products, namely an AA7021 type alloy, a cladded AA7021 type alloy and an AA6016 alloy in various tempers for a 230 mm blank size.
Figure 8:
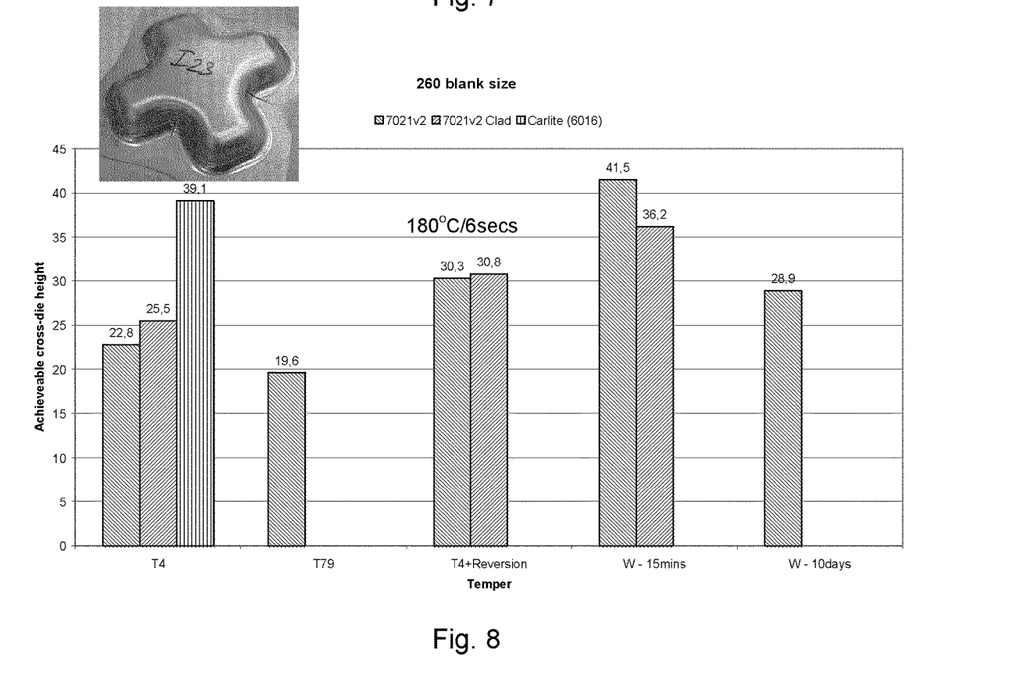
FIG. 8: Achievable cup height for various sheet materials, namely an AA7021 type alloy, a cladded AA7021 type alloy and an AA6016 alloy in various tempers for 260 mm blank size.

Three different sheet products were prepared and subjected to a deep drawing trial done on a cross-die, wherein the cup height at rupture was measured. The three sheet materials consisted of a bare sheet material of the enriched AA7021 type alloy of example 1 (7021v2), a composite sheet product having the same core composition and clad with AA7072 alloy (7021v2 clad), and for comparison purposes a sheet product having a composition of the AA6016 series (Carlite). The sheet products were cut to sizes of 230 mm and 260 mm, and brought to the different temper conditions shown in FIGS. 7 and 8. The middle shows the achievable cross-die height of T4 samples subjected to a reversion annealing treatment at 180° C. for 6 seconds. On the right, different W-tempers have been tested, and the left shows the achievable cross-die in T4-temper.

The results show that—although the W-temper yields the best formability—the formability after a reversion annealing treatment according to the invention is still substantially better than the formability in T4 or T79 tempers.

Thus, in situations where the W-temper process is not preferred because of the high energy consumption and the higher risk of the aluminium sheets sticking to the tooling, the inventive reversion annealing treatment will be the method of choice, since it can be done at a temperature as low as 180° C., and therefore, the treatment is much less time and energy consuming. Also, the risk that the aluminium sheets start sticking to the tooling if direct contact heating is used, is practically zero. In other words, when the design of a structural part or BIW part cannot be formed starting from a bare or composite AA7xxx-alloy sheet in T4 (T6x or T7x) temper at room temperature, and if it is not so complex that it must be brought back to the W-temper, applying the inventive reversion annealing treatment to bare or composite AA7xxx-alloy sheets in T4 temper before they are being formed at room temperature is a very cost effective solution. Further, a low spring back and low press forces are advantages compared to classic tempers like T4. In addition, standard lubricants can be used.

The invention claimed is:

1. A method of manufacturing a three-dimensionally formed aluminium alloy automotive structural part or a body-in-white (BIW) part of a motor vehicle, the method comprising:
providing a rolled aluminium alloy bare or composite sheet product having a gauge in a range of about 0.5 mm to 4 mm, wherein the sheet product comprises at least one layer made from an aluminium alloy of the AA7xxx-series, the sheet product having been subjected to solution heat treatment and quenching followed by a period of natural ageing of at least 1 day to result in a T4 temper condition;
subjecting the naturally aged sheet product to a reversion annealing treatment comprising heating the naturally aged sheet product at a fast heating rate of between 20° C. to 60° C. per second to reach a reversion annealing temperature of between 170° C. and 220° C. which is held for 2 to 15 seconds wherein temperature during reversion annealing treatment does not exceed said reversion annealing temperature of between 170° C. and 220° C.;
then subjecting the heated reversion annealed sheet product to a forced cooling operation at a rate of 5° C.-50° C. per second; and
within 2 hours, from the reversion annealing treatment, forming the sheet product to obtain the three-dimensionally formed automotive structural part or body-in-white (BIW) part.

2. The method of claim 1, wherein the three-dimensionally formed automotive structural part is subjected to a paint bake cycle within 1 day of forming, and wherein said paint bake cycle results in a yield strength of at least about 300 MPa.

3. The method according to claim 2, wherein between forming and the paint bake cycle, the three-dimensionally formed automotive structural part is subjected to a pre-ageing heat treatment at a temperature between 50° C. and 250° C. for between 1 minute and 5 hours.

4. The method according to claim 1, wherein the heat treatment in the reversion annealing treatment is done by contact heating in which the sheet product is held between two hot plates, and wherein the forced cooling operation is done by contact cooling in which the sheet product is held between two cold plates.

5. The method according to claim 1, wherein said bare sheet or a core of the composite sheet is made out of an aluminium alloy having a composition consisting of, in wt. %,
Zn 3.8 to 8.2;
Mg 1.5 to 2.3;
Cu 0.6 to 2.4;
Zr 0.04 to 0.25;
optionally one or two elements selected from the group consisting of
Mn 0.05 to 0.5,
Cr 0.05 to 0.5,
Ti 0 to 0.15,
Fe 0 to 0.35, and
Si 0 to 0.25;
other elements (or unavoidable impurities) each <0.05 and total <0.2; and
balance aluminium.

6. The method according to claim 1, wherein the sheet product is subjected to the reversion annealing treatment in between two forming steps.

7. The method according to claim 1, wherein the sheet product is cut into blanks after the reversion annealing treatment and before forming.

8. The method according to claim 1, wherein the rolled sheet product is a composite sheet product having a core layer made from an aluminium alloy of the AA7xxx-series, and a clad layer made from an AA6xxx-series alloy or a lean AA7xxx-series alloy.

9. The method according to claim 1, wherein said bare sheet or a core of the composite sheet is made out of an aluminium alloy having a composition consisting of, in wt. %,
Zn 3.8 to 8.2;
Mg 1.5 to 2.3;
Cu <0.45;
Zr 0.04 to 0.25;
optionally one or two elements selected from the group consisting of
Mn 0.05 to 0.5,
Cr 0.05 to 0.5,
Ti 0 to 0.15,
Fe 0 to 0.35, and
Si 0 to 0.25;
other elements (or unavoidable impurities) each <0.05 and total <0.2; and
balance aluminium.

10. The method of claim 1, wherein the three-dimensionally formed automotive structural part is subjected to a paint bake cycle within 1 day of forming, and wherein said paint bake cycle results in a yield strength of at least about 350 MPa.

11. The method of claim 1, wherein the three-dimensionally formed automotive structural part is subjected to a paint bake cycle within 1 day of forming, and wherein said paint bake cycle results in a yield strength of at least about 400 MPa.

12. The method according to claim 1, wherein the rolled aluminium alloy bare or composite sheet product has a gauge in a range of about 1.0 mm to 3 mm, wherein the reversion annealing temperature to which the sheet product is heated during the reversion annealing treatment is in a range of greater than 175° C. to at most 180° C. and held for 6 to 8 seconds, wherein temperature during reversion annealing treatment does not exceed said reversion annealing temperature of greater than 175° C. to at most 180° C.

13. The method according to claim 12, wherein said bare sheet or a core of the composite sheet is made out of an aluminium alloy having a composition consisting of, in wt. %, Zn 5.5 to 6.5;
Mg 1.5 to 2.1;
Cu <0.30 or Cu 1.2 to 2.4;
Zr 0.04 to 0.25;
optionally one or two elements selected from the group consisting of;
Mn 0.05 to 0.5,
Cr 0.05 to 0.5,
Ti 0 to 0.15,
Fe 0 to 0.35, and
Si 0 to 0.25;
other elements (or unavoidable impurities) each <0.05 and total <0.2; and
balance aluminium.

14. The method according to claim 12, wherein said bare sheet or a core of the composite sheet is made out of an aluminium alloy having a composition consisting of, in wt. %, Zn 5.5 to 6.5;
Mg 1.9 to 2.1;
Zr 0.04 to 0.14;
optionally one or two elements selected from the group consisting of;
Mn 0.05 to 0.5,
Cr 0.05 to 0.5,
Ti 0 to 0.15,
Fe 0 to 0.15, and
Si 0 to 0.1;
other elements (or unavoidable impurities) each <0.05 and total <0.2; and
balance aluminium.

15. The method according to claim 12, wherein the sheet product is a composite sheet product having a core layer made from AA7081 aluminium alloy.

16. The method according to claim 1, wherein the reversion annealing temperature to which the sheet product is heated during the reversion annealing treatment is between 175° C. and 190° C., wherein temperature during reversion annealing treatment does not exceed said reversion annealing temperature of between 175° C. and 190° C.

17. The method according to claim 1, wherein the sheet product is a composite sheet product having a core layer made from an aluminium alloy of the AA7xxx-series, and a clad layer made from a AA7072 alloy.

18. The method according to claim 1, wherein said bare sheet or a core of the composite sheet is made out of an aluminium alloy having a composition consisting of, in wt. %, Zn 5.0 to 7.0;
Mg 1.5 to 2.1;
Cu <0.30;
Zr 0.04 to 0.25;
optionally one or two elements selected from the group consisting of;
Mn 0.05 to 0.5,
Cr 0.05 to 0.5,
Ti 0 to 0.15,
Fe 0 to 0.35, and
Si 0 to 0.25;
other elements (or unavoidable impurities) each <0.05 and total <0.2; and
balance aluminium.

19. The method according to claim 1, wherein said bare sheet or a core of the composite sheet is made out of an aluminium alloy having a composition consisting of, in wt. %, Zn 5.0 to 7.0;
Mg 1.5 to 2.1;
Cu 1.2 to 2.4;
Zr 0.04 to 0.25;
optionally one or two elements selected from the group consisting of;
Mn 0.05 to 0.5,
Cr 0.05 to 0.5,
Ti 0 to 0.15,
Fe 0 to 0.35, and
Si 0 to 0.25;
other elements (or unavoidable impurities) each <0.05 and total <0.2; and
balance aluminium.

* * * * *